(12) United States Patent
Dionne

(10) Patent No.: US 10,875,660 B1
(45) Date of Patent: Dec. 29, 2020

(54) AIRCRAFT POWER PLANT

(71) Applicant: PRATT & WHITNEY CANADA CORP., Longueuil (CA)

(72) Inventor: Luc Dionne, Candiac (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 16/432,048

(22) Filed: Jun. 5, 2019

(51) Int. Cl.
*F02M 35/10* (2006.01)
*B64D 33/08* (2006.01)
*B64D 13/08* (2006.01)
*F02C 7/143* (2006.01)
*F01D 25/30* (2006.01)
*B64D 13/06* (2006.01)

(52) U.S. Cl.
CPC ............ *B64D 33/08* (2013.01); *B64D 13/08* (2013.01); *F02C 7/143* (2013.01); *B64D 2013/0611* (2013.01); *F01D 25/305* (2013.01)

(58) Field of Classification Search
CPC .. B64D 2027/026; B64D 33/08; B64D 13/08; B64D 27/06
See application file for complete search history.

(56) References Cited

U.S. PATENT DOCUMENTS

| | | | |
|---|---|---|---|
| 5,137,230 A * | 8/1992 | Coffinberry | B64D 13/06 244/118.5 |
| 5,265,408 A | 11/1993 | Sheoran et al. | |
| 6,092,360 A | 7/2000 | Hoag et al. | |
| 8,322,981 B2 | 12/2012 | Light et al. | |
| 8,621,842 B2 | 1/2014 | Francisco et al. | |
| 8,794,571 B2 | 8/2014 | Baumgardt et al. | |
| 9,644,538 B2 | 5/2017 | Dionne | |
| 2009/0188232 A1* | 7/2009 | Suciu | F02C 6/08 60/39.83 |
| 2014/0339357 A1* | 11/2014 | Richardson | B64D 15/04 244/54 |
| 2015/0232191 A1* | 8/2015 | Wetzel | B64D 33/08 244/53 R |
| 2017/0036775 A1 | 2/2017 | Jones et al. | |
| 2017/0037776 A1* | 2/2017 | Jones | F02C 7/14 |
| 2017/0226959 A1* | 8/2017 | Julien | F02B 63/06 |
| 2017/0268409 A1* | 9/2017 | Thomassin | B64C 9/38 |
| 2018/0050811 A1* | 2/2018 | Niergarth | B64C 21/06 |
| 2018/0106225 A1* | 4/2018 | Dionne | B64D 33/02 |

* cited by examiner

*Primary Examiner* — Long T Tran
(74) *Attorney, Agent, or Firm* — Norton Rose Fulbright Canada LLP

(57) ABSTRACT

There is disclosed a cooling system for a liquid cooled internal combustion aircraft power plant for an aircraft having a tail cone. The cooling system has: an air inlet defined through a wall of the tail cone and fluidly connected to an environment outside the aircraft; a heat exchanger having at least one first conduit fluidly connected to the environment via the air inlet and at least one second conduit in heat exchange relationship with the at least one first conduit and fluidly connectable to a coolant circuitry of the liquid cooled internal combustion aircraft power plant; a blower fluidly connected to the environment via the air inlet; and an air outlet fluidly connected to the blower and defined through a wall of the aircraft upstream of the air inlet relative to a direction of an airflow along the aircraft.

17 Claims, 4 Drawing Sheets

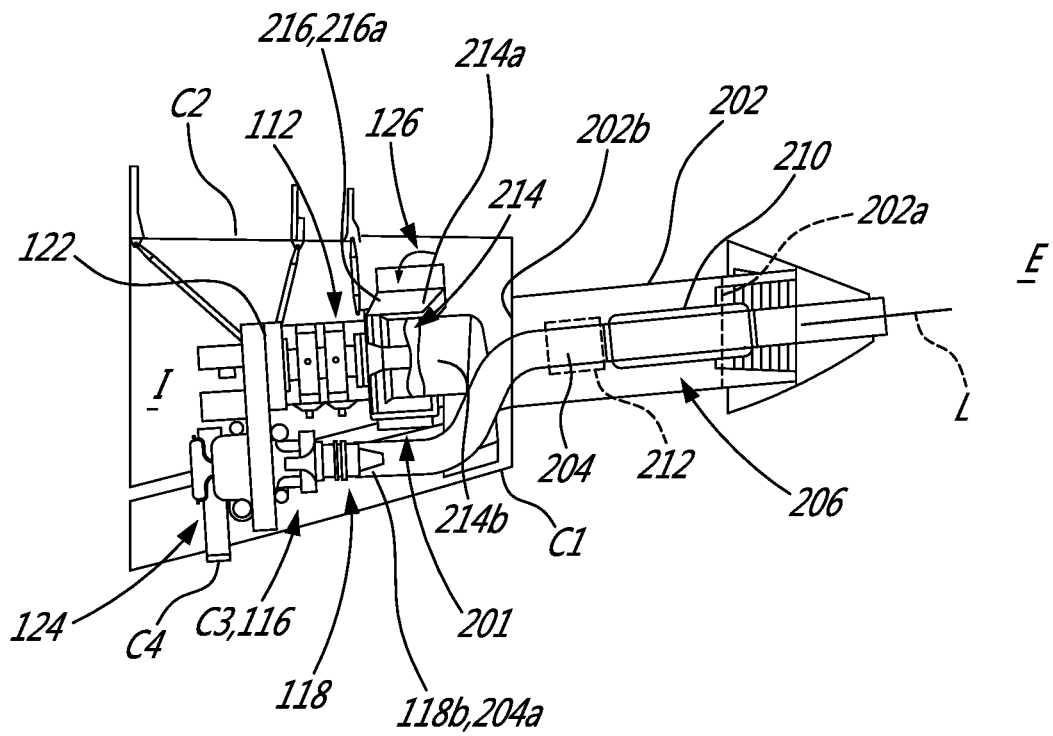
FIG_4
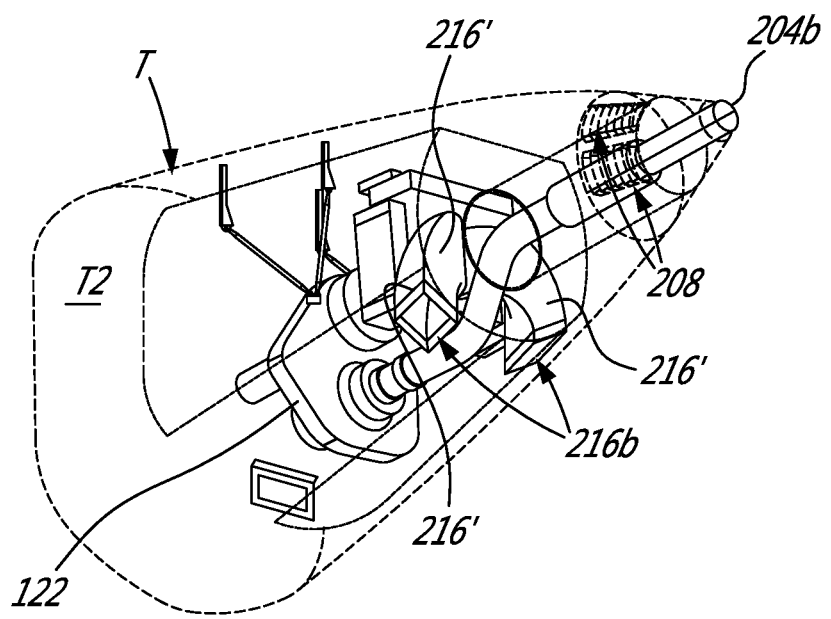
FIG_5

US 10,875,660 B1

AIRCRAFT POWER PLANT

TECHNICAL FIELD

The application relates generally to aircraft power plants and, more particularly, to systems and methods for supplying air to be used by such power plants.

BACKGROUND OF THE ART

An aircraft power plant, such as an auxiliary power unit (APU), is usually contained within an engine compartment defined by an aircraft. In some cases, either a liquid coolant and/or a lubricant of the power plant needs to be cooled.

SUMMARY

In one aspect, there is provided a cooling system for a liquid cooled internal combustion aircraft power plant for an aircraft having a tail cone, the cooling system comprising: an air inlet defined through a wall of the tail cone and fluidly connected to an environment outside the aircraft; a heat exchanger having at least one first conduit fluidly connected to the environment via the air inlet and at least one second conduit in heat exchange relationship with the at least one first conduit and fluidly connectable to a coolant circuitry of the liquid cooled internal combustion aircraft power plant; a blower fluidly connected to the environment via the air inlet; and an air outlet fluidly connected to the blower and defined through a wall of the aircraft upstream of the air inlet relative to a direction of an airflow along the aircraft.

In another aspect, there is provided a method of operating a cooling system for a liquid cooled internal combustion aircraft power plant for an aircraft having a tail cone, the method comprising: driving a rotatable load with the liquid cooled internal combustion aircraft power plant; driving a flow of cooling air from an environment outside the aircraft via an air inlet defined through a wall of the tail cone; and heating the flow of cooling air by cooling a liquid coolant of the liquid cooled internal combustion aircraft power plant and expelling the heated flow of cooling air back to the environment at a location upstream of the air inlet relative to a direction of an airflow along the aircraft.

In yet another aspect, there is provided an aircraft power plant configured to be located within a tail cone of an aircraft, comprising: an intermittent internal combustion engine having a coolant circuitry for circulating a liquid coolant; an air inlet defined through a wall of the tail cone and fluidly connected to an environment outside the aircraft; a heat exchanger having at least one first conduit fluidly connected to the environment via the air inlet and at least one second conduit in heat exchange relationship with the at least one first conduit and fluidly connected to the coolant circuitry; a blower fluidly connected to the environment via the air inlet; and an air outlet fluidly connected to the blower, the air outlet defined through a wall of the aircraft upstream of the air inlet relative to a direction of an airflow along the aircraft.

DESCRIPTION OF THE DRAWINGS

Reference is now made to the accompanying figures in which:

FIG. 4 is a schematic cross-sectional view of the aircraft power plant of FIG. 3;

FIG. 5 is a schematic bottom three dimensional view of the aircraft power plant of FIG. 3;

DETAILED DESCRIPTION

Figure 1:
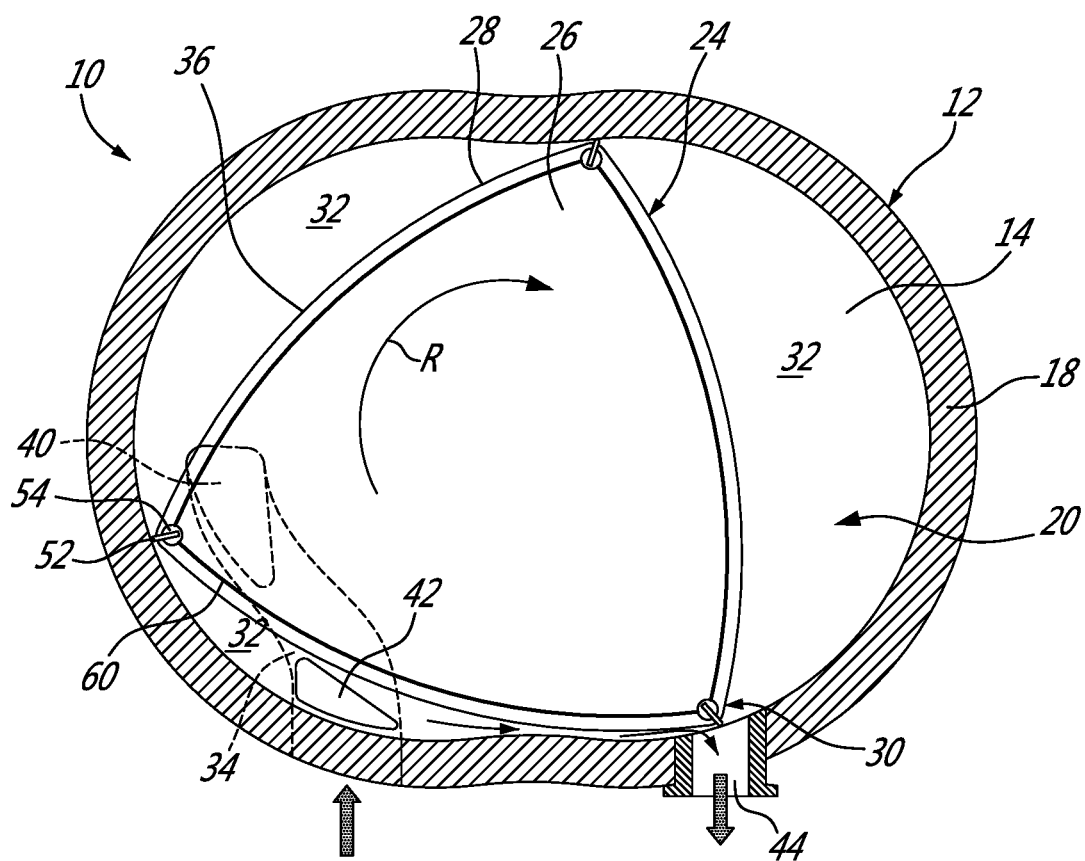
FIG. 1 is a schematic cross-sectional view of a rotary internal combustion engine in accordance with a particular embodiment.

Referring to FIG. 1, a rotary internal combustion engine 10 known as a Wankel engine is schematically shown. The rotary engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

In a particular embodiment, the outer body 12 is made of aluminum. Aluminum might be advantageous for aircraft applications as it is less dense then steel. However, aluminum has a coefficient of thermal conductivity greater than that of the steel and has a melting point lower than that of the steel. Proper cooling might be required when using an internal combustion engine having a body made of aluminum. More detail about this are presented herein below.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the inner rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective end wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent end wall 14. Alternate sealing arrangements are also possible.

Although not shown in the Figures, the rotor 24 is journaled on an eccentric portion of a shaft such that the shaft rotates the rotor 24 to perform orbital revolutions within the stator cavity 20. The shaft rotates three times for each complete rotation of the rotor 24 as it moves around the stator cavity 20. Oil seals are provided around the eccentric to impede leakage flow of lubricating oil radially outwardly thereof between the respective rotor end face 26 and outer body end wall 14. During each rotation of the rotor 24, each chamber 32 varies in volumes and moves around the stator cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port 42 also in communication with the source of air (e.g. a compressor) and located between the inlet and exhaust ports 40, 44. The ports 40, 42, 44 may be defined in the end wall 14 of in the peripheral wall 18. In the embodiment shown, the inlet port 40 and purge port 42 are defined in the end wall 14 and communicate with a same intake duct 34 defined as a channel in the end wall 14, and the exhaust port 44 is defined through the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 2:
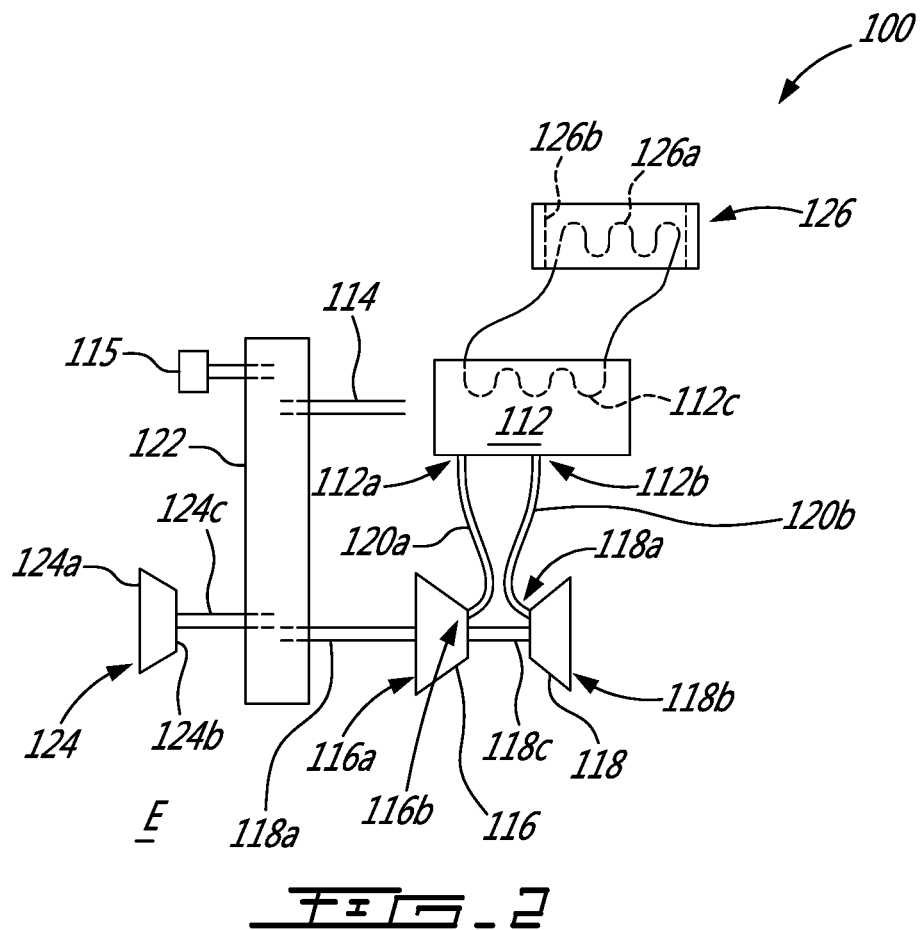
FIG. 2 is a schematic view of an engine assembly in accordance with one embodiment.

Referring to FIG. 2, an engine assembly 100 is generally shown and includes an internal combustion engine 112. In a particular embodiment, the internal combustion engine 112 comprises one or more rotary units each configured for example as a Wankel engine, or one or more reciprocating pistons. The internal combustion engine 112 may be the rotary internal combustion engine 10 described herein above with reference to FIG. 1. Any other suitable intermittent internal combustion engine, such as a piston engine, may be used without departing from the scope of the present disclosure.

The internal combustion engine 112 drives a shaft 114 that is used for driving a rotatable load 115. It is understood that the rotatable load 115 may be any appropriate type of load, including, but not limited to, one or more generator(s), propeller(s), accessory(ies), rotor mast(s), compressor(s), or any other appropriate type of load or combination thereof. In a particular embodiment, the internal combustion engine 112 is a rotary engine comprising three rotary units each configured as a Wankel engine, with a rotor cavity having a profile defining two lobes, preferably an epitrochoid, in which a rotor is received with the geometrical axis of the rotor being offset from and parallel to the axis of the rotor cavity, and with the rotor having three circumferentially-spaced apex portions and a generally triangular profile with outwardly arched sides, so as to define three rotating combustion chambers with variable volume.

In a particular embodiment, the engine assembly 100 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The engine assembly 10 may be used as a prime mover engine, such as on an aircraft or other vehicle, or in any other suitable application. The engine assembly 10 may include a turboprop or a turboshaft instead of the internal combustion engine.

In the embodiment shown, the engine assembly 100 includes a compressor 116 for compressing the air before it is fed to an air inlet 112a of the internal combustion engine 112 and a turbine section 118 receiving the exhaust gases from the internal combustion engine 112. It is understood that variations are possible, and that, for example, the compressor 116 and/or turbine section 118 may be omitted.

The compressor has a compressor inlet 116a fluidly connectable to an environment E outside the engine assembly, also referred to herein as a source of ambient air, and a compressor outlet 116b fluidly connected to the air inlet 112a of the internal combustion engine 112 via a conduit 120a. The turbine section 118 includes a turbine inlet 118a fluidly connected to an exhaust 112b of the internal combustion engine 112 via a conduit 120b and a turbine outlet 118b fluidly connected to the environment E for expelling the exhaust gases generated by the internal combustion engine 112.

The internal combustion engine 112 provides an exhaust flow of high pressure hot gas exiting at high peak velocity, in the form of exhaust pulses. In the illustrated embodiment, the exhaust 112b of the internal combustion engine 112 (corresponding to or communicating with an exhaust port of a respective rotary engines/reciprocating pistons of the internal combustion engine 112) is in fluid communication with the turbine inlet 118a of the turbine section 118. Accordingly, the exhaust flow from the internal combustion engine 112 is supplied to the turbine section 118. The turbine section 118 may comprise a single turbine, or two or more turbine stages in serial fluid communication; the two or more turbine stages may have different reaction ratios from one another. Other configurations are contemplated.

In the illustrated embodiment, the internal combustion engine 112, the compressor 116, the rotatable load 115, and the turbine section 118 are in driving engagement with a gearbox 122. The gearbox 122 is configured to allow the turbine section 118 to compound power with the engine shaft 114 and to allow the turbine section 118 and/or the internal combustion engine 112 to drive the compressor 116 and/or the rotatable load 115. In the embodiment shown, the rotatable load 115 is in driving engagement with the engine shaft 114 and/or a turbine shaft 118c via the gearbox 122.

In the illustrated embodiment, the compressor 116 and the turbine section 118 are in a driving engagement with the gearbox 122. In the illustrated embodiment, the compressor and turbine rotors are engaged to the turbine shaft 118c which is drivingly engaged to the engine shaft 114 through the gearbox 120; the turbine shaft 118c and the engine shaft 114 are parallel and radially offset from one another. Alternate configurations are possible, including, but not limited to, the rotor(s) of the compressor 116 being engaged to a shaft separate from the turbine shaft 118c (whether coaxial with the turbine shaft 118c, with the engine shaft 114, or offset from both) and in driving engagement with the turbine shaft 118c and/or the engine shaft 114, for example through the gearbox 120; and/or two or more of the shafts 118a, 114 extending at an angle (perpendicularly or otherwise) to each other.

In the embodiment shown, the engine assembly 100 further includes a load compressor 124 configured for providing compressed air to a pneumatic system of an aircraft containing the engine assembly 100. The load compressor 124 has a load compressor inlet 124a fluidly connected to the environment E and a load compressor outlet 124b fluidly connected to the pneumatic system.

The load compressor 124 includes at least one rotor rotating with a load compressor shaft 124c. The shaft 124c of the load compressor 124 is, in the depicted embodiment, in driving engagement with the engine shaft 114 and/or with the turbine shaft 118c via the gearbox 122. The shaft 124c of the load compressor 124 and the turbine shaft 118c may be monolithic. The load compressor shaft 124c of the load compressor 124 may be coaxial with the turbine shaft 118c.

Still referring to FIG. 2, the internal combustion engine 112 is liquid cooled and includes a coolant circuitry 112c configured for circulating a liquid coolant. The engine assembly 100 includes a heat exchanger 126 for expelling heat from the liquid coolant to the environment E. The heat exchanger 126 includes at least one first conduit 126a and at least one second conduit 126b in heat exchange relationship with the at least one first conduit 126a. The at least one first conduit 126a is fluidly connected to the coolant circuitry 112c of the internal combustion engine 112. The at least one second conduit 126b is fluidly connected to the environment E for receiving a flow of cooling air from the environment E.

The heat exchanger 126 may be used for providing heat exchange relationship between a lubricant circuit of the engine 112 and the air for cooling lubricant circulating within the lubricant circuit. The lubricant may be used, for instance, for lubricating bearings. In a rotary internal combustion engine, the lubricant is used for lubricating the faces of the rotor 24 and for cooling down sealing faces of the rotor 24. The engine assembly 100 may include more than one heat exchanger each configured for transferring heat from a respective one of fluids (e.g., lubricant, liquid coolant) used by the engine to the environment E.

In use, heat generated by the combustion of fuel within combustion chambers of the internal combustion engine 112 is dissipated within a casing, or body, of the internal combustion engine 112. The heat is then transmitted from the body to the liquid coolant circulating within the coolant circuitry 112c before being transmitted from the liquid coolant to the flow of cooling air from the environment E via the heat exchange relationship between the at least one first conduit 126a and at least one second conduit 126b of the heat exchanger 126.

Figure 3:
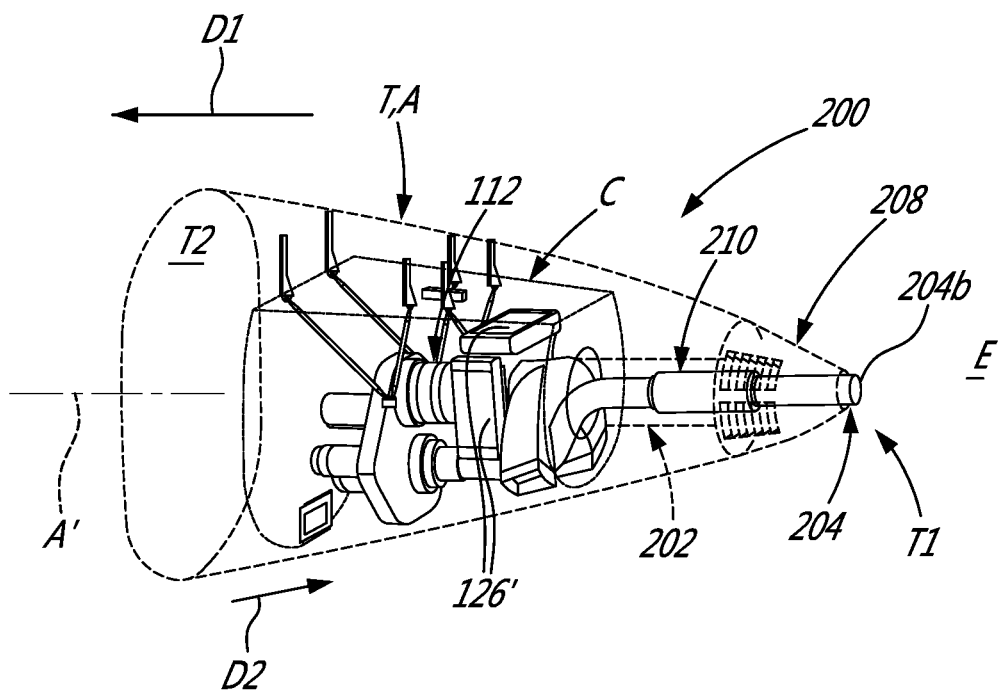
FIG. 3 is a schematic three dimensional partially transparent view of an aircraft power plant in accordance with one embodiment contained within an engine compartment located within a tail section of an aircraft.

Referring now to FIGS. 3-4, an aircraft power plant 200, also referred to as a liquid cooled internal combustion aircraft power plant, which may include the engine assembly 100 of FIG. 2, is shown installed within an engine compartment C located inside a tail section T of an aircraft A. The power plant 200 may be an auxiliary power unit (APU). The tail section T ends at an apex T1. The tail section T may correspond to a portion of the aircraft where a cross-sectional area of the aircraft A decreases along an aircraft axis A' of the aircraft intersecting the apex T1. In other words, a wall T2 of the tail section T converges toward the apex T1. The apex T1 may correspond to a rear-most location of a fuselage of the aircraft A.

Internal combustion engines usually have a higher cooling requirement than a gas turbine engine for the same power. Moreover, and as aforementioned, the body of the internal combustion engine 112 may be made entirely of, or partially from, aluminum. The use of such a material may be beneficial from an aircraft performance point of view as it is lighter than steel. However, its melting point is lower than steel. Proper cooling of the body of such an engine, especially when made of aluminum, might be required.

In this regard, the power plant 200 includes a cooling system 201. The air may be used for cooling the internal combustion engine 112, for feeding air to the air inlet 112a of the internal combustion engine 112, for feeding air to the load compressor 124, and/or any other suitable use of air that might be required for operation of the aircraft A and/or of the power plant 200.

In the embodiment shown, the power plant 200 includes an air inlet pipe 202, also referred to as a shroud conduit or an air inlet conduit. The air inlet pipe 202 has a pipe inlet 202a fluidly connected to the environment E outside the engine compartment C and an a pipe outlet 202b fluidly connected to an interior I of the engine compartment C. The air inlet pipe 202 extends along a longitudinal axis L.

The power plant 200 includes an exhaust pipe 204 that is fluidly connected to the turbine outlet 118b of the turbine section 118 and configured for expelling the exhaust gases in the environment E. In the embodiment shown, the exhaust pipe 204 is coincident with the aircraft axis A'.

In the embodiment shown, the exhaust pipe 204 is located within the air inlet pipe 202. In other words, the air inlet pipe 202 surrounds the exhaust pipe 204. In a particular embodiment, the exhaust pipe 204 and the air inlet pipe 202 are concentric and their respective longitudinal axes are coincident. An annulus 206 is defined radially between the exhaust pipe 204 and the air inlet pipe 202 relative to the longitudinal axis L. The annulus 206 is fluidly connected to the environment E. The air from the environment E circulates therefrom to the interior I of the engine compartment C via the annulus 206.

In the depicted embodiment, the air from the environment E penetrates the annulus 206 via louvers 208, which are described in more detail herein below, and is directed within the air inlet conduit 202 to the engine compartment C. The air then circulates through the heat exchanger 126 where it picks up heat from the liquid coolant circulating within the coolant circuitry 112c of the internal combustion engine 112. In other words, the at least one second conduit 126b of the heat exchanger 126 is fluidly connected to the annulus 206. The air that has been heated via its passage through the at least one second conduit 126b of the heat exchangers 126 by picking up heat from the liquid coolant is expelled back to the environment E via air outlets C1 defined through walls C2, T2 of the engine compartment C and of the tail cone T. The air is then expelled in the environment E through the wall T2 of the tail section T. It is understood that the walls C2, T2 of the engine compartment C and of the tail cone T may correspond to a same and unique wall.

In the embodiment shown, the air outlets C1 are located upstream of the louvers 208 relative to a direction D2 of an airflow along the aircraft A; the aircraft having a direction of travel D1 opposite the direction D2 of the airflow. Stated differently, the air used for cooling the power plant 200 is drawn at a first location through a wall of the aircraft and, once heated, expelled at a second location through a wall of the aircraft; the second location upstream of the first location relative to the direction D2 of the airflow along the aircraft.

In the embodiment shown, air for the combustion of the fuel within the combustion chambers of the internal combustion engine 112 enters the compressor inlet 116a (FIG. 2) via an air inlet C3 defined through the walls T2, C2 of the tail section T and of the engine compartment C. A filter may be disposed over the air inlet C3 so that air is filtered before reaching the compressor inlet 116a.

The load compressor 124 may have its inlet 124a fluidly connected to the environment E via a second air inlet C4 defined through the walls T2, C2 of the tail section T and of the engine compartment C. A filter may be disposed over the second air inlet C4 so that air is filtered before reaching the inlet 124a of the load compressor 124. The air inlet C3 for the compressor 116 and the second air inlet C4 of the load compressor may be independent from each other. In the depicted embodiment, the air inlet C3 of the compressor 116 is fluidly connected to the environment E independently of the annulus 206. In other words, the air that circulates through the annulus 206 toward the engine compartment C might not be used to feed air to the air inlet 112a of the internal combustion engine 112. Alternatively, air provided to the air inlet 112a (FIG. 2) of the internal combustion engine 112 may be drawn from the engine compartment C.

In the embodiment shown, the air that enters the engine compartment C via the annulus 206 may be used for two purposes: cooling the internal combustion engine 112 and exchanging the air contained within the engine compartment C to avoid fuel emanation to accumulate therein. In the embodiment shown, the engine compartment C is fluidly connected to the environment E solely via the annulus 206.

As discussed herein above with reference to FIG. 2, the compressed air is fed to the internal combustion engine 112 and the exhaust gases generated by the engine 112 are fed to the turbine section 118 for being outputted to the environment E via the exhaust pipe 204. An acoustic attenuator, or muffler, 210 may be fluidly connected to the exhaust pipe 204 for decreasing noise generated by the engine 112. The acoustic attenuator 210 may be located within the tail section T of the aircraft C. In the embodiment shown, the acoustic attenuator 210 is located at least partially within the annulus 206 between the exhaust pipe 204 and the air inlet pipe 202.

As aforementioned, the body of the internal combustion engine 112 may be made entirely of, or partially from, aluminum. The use of such a material may be beneficial from an aircraft performance point of view as it is lighter than steel. However, its melting point is lower than steel. Proper cooling of the body of such an engine might be required.

In this view, thermal blankets 212 may be disposed on an external face of the exhaust pipe 204 and within the annulus 206 for decreasing an amount of heat transferred from the exhaust gases circulating within the exhaust pipe 204 to the air circulating within the annulus 206. As the air circulating in the annulus 206 may be used for cooling the internal combustion engine 112, it might be preferred to feed air as cool as possible to the heat exchangers 126. The thermal blankets 212 might help in keeping a temperature of the air reaching the engine compartment C as close as possible as a temperature of the air within the environment E. Stated differently, the thermal blankets 212 might decrease a temperature increase of the air within the annulus compared to a configuration lacking such thermal blankets 212.

Referring more particularly to FIG. 4, the power plant 200 includes a blower 214 used for drawing air from the environment E in the engine compartment C via the annulus 206. The blower 206 has a blower inlet 214a fluidly connected to the environment E via the annulus 206 and a blower outlet 214b fluidly connected to the environment E for expelling air that has been heated by the liquid coolant.

In the embodiment shown, the blower 214 is in driving engagement with the shaft 114 (FIG. 2) of the engine 112. However, it is understood that the blower 214 may be electrically, hydraulically, and/or pneumatically driven without departing from the scope of the present disclosure. The blower 214, in use, decreases an air pressure within the engine compartment C thereby creating a suction effect at the louvers 208 that are fluidly connected to the air inlet conduit 202. Other configurations are contemplated.

Referring to FIGS. 4-5, the blower 214 is located within a conduit 216 having an inlet 216a and an outlet 216b. The inlet 216a of the conduit 216 is fluidly connected to the environment E via the annulus 206 and via the at least one second conduit 126b (FIG. 2) of the heat exchanger 126. The heat exchanger 126 may span the inlet 216a of the conduit 216 such that all the air entering the conduit 216 passes through the heat exchanger 126. The heat exchanger 126 is disposed adjacent the inlet 216a of the conduit 216. In the embodiment shown, the inlet 216a of the conduit 216 is downstream of the heat exchanger 126 relative to a flow of air circulating form the annulus 216 and through the heat exchanger 126. Other configurations are contemplated. For instance, the heat exchanger may be located downstream of the blower 214.

In the depicted embodiment, the heat exchanger 126 has three heat exchanger sections 126' that are circumferentially disposed one next to the other around the blower 214. Stated differently, the three heat exchanger sections 126' are circumferentially disposed around a rotation axis of the blower 214, which, in this case, coincides with the shaft 114 of the internal combustion engine 112. In the embodiment shown, the inlet 216a of the conduit 216 containing the blower 214 extends circumferentially around the blower 214. All of the three heat exchanger sections 126' may be used for cooling the liquid coolant of the internal combustion engine 112. Alternatively, at least one of the three heat exchanger sections 126' may have its at least one first conduit 126a fluidly connected to a lubricant circuit of the engine 112 for transferring heat from the lubricant to the environment E.

Figure 6:
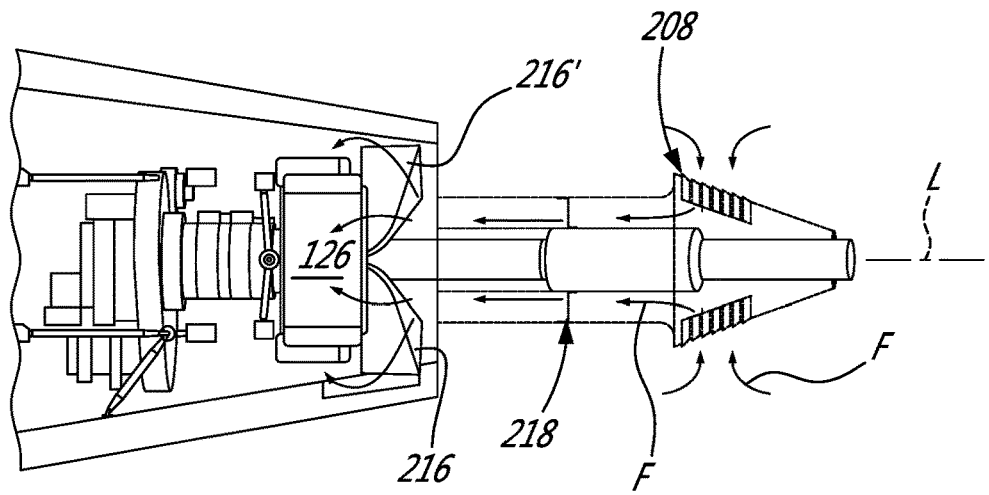
FIG. 6 is a schematic top partially transparent view of the aircraft power plant of FIG. 3.

Referring more particularly to FIGS. 5-6, the conduit 216 containing the blower 214 divides in two sub-conduits 216' downstream of the blower outlet 214b. As more clearly seen on FIG. 5, the exhaust conduit 204 passes between the two sub-conduits 216'. Each of the two sub-conduits 216' has an outlet fluidly connected to the air outlets C1 defined through the walls T2, C2 of the tail cone T and of the engine compartment C. In the embodiment shown, each of the two sub-conduits 216' extends substantially parallel to the axis of rotation of the blower 214 from the blower outlet 214b then curves radially away from the axis of rotation of the blower 214 toward a bottom of the engine compartment C down to the air outlet C1 of the engine compartment C.

Figure 7:
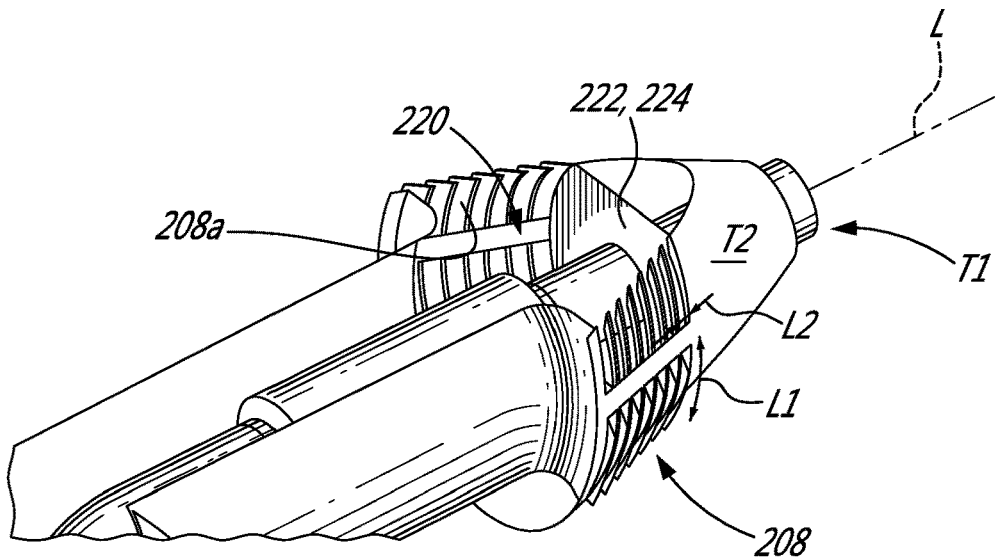
FIG. 7 is a schematic cut-away view of an air inlet conduit of the aircraft power plant of FIG. 3.
Figure 8:
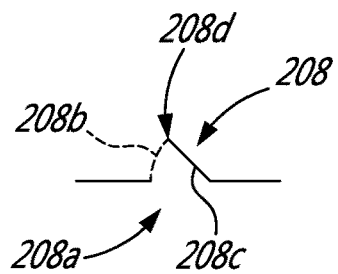
FIG. 8 is a schematic cross-sectional view of a louver in accordance with one embodiment that may be used as an inlet for the air inlet conduit show in FIG. 7.

Referring now to FIGS. 6-8, the shroud conduit 202 may be used to support the engine exhaust pipe 204. As aforementioned, the shroud conduit 202 defines a gaspath, referred to above as the annulus 206, to draw cooling air from the environment E outside of the tail cone T of the aircraft A to the engine, or APU, compartment C located within the tail cone T. In the embodiment shown, segmented exhaust supports 218 are used to locate the exhaust pipe 204 within the shroud conduit 202. Those support 218 extend radially relative to the longitudinal axis L from the exhaust pipe 204 to the shroud conduit 202 and may be secured to one or both of the exhaust pipe 204 and the shroud conduit 202.

In the embodiment shown, the louvers 208 are defined by the wall T2 of the tail section T of the aircraft A. The louvers 208 define an air inlet 208a of the engine compartment C. Stated differently, the engine compartment C is fluidly connected to the environment E via the air inlet 208a defined by the louvers 208.

The wall T2 of the tail section T at the louvers 208 surrounds a plenum 220. The plenum 220 is fluidly connected to the annulus 206 and extends radially from the exhaust pipe 204 to the wall T2 of the tail cone T. In the embodiment shown, the engine compartment C is fluidly connected to the environment E via the annulus 206, the plenum 220, and the air inlet 208a defined by the louvers 208.

As shown more clearly on FIG. 7, a rear frame aft closure 222 extends from the exhaust pipe 204 to the wall T2 and provides support to the exhaust pipe 204. The rear frame aft closure 222 is provided in the form of an annular wall 224 circumferentially extending all around the longitudinal axis L and sealingly receiving there through the exhaust pipe 204. The annular wall 224 extends at least radially relative to the longitudinal axis L from the exhaust pipe 204 to the wall T2 of the tail cone T. The annular wall 224 may provide a sealed interface at a rear of the inlet plenum 220 to prevent the exhaust gases from being ingested in the annulus 206. In other words, the annular wall 224 may be in a sealing engagement against both of the exhaust pipe 204 and the wall T2 of the tail cone T.

In the embodiment shown, each of the louvers 208 extends along a width L1 taken in a circumferential direction relative to the longitudinal axis L of the air inlet conduit 202 and along a length L2 taken in an axial direction relative to the longitudinal axis L; the width L1 being greater than the length L2.

Referring to FIGS. 7-8, each of the louvers 208 defines an opening 208b that is oriented away from the apex T1. In the embodiment shown, each of the louvers 208 includes a slat 208c extending at an angle from the wall T2 to an edge 208d of the slat 208c. The opening 208b is defined between the wall T2 to the edge 208d of the slat 208c. The opening 208b may be oriented away from the apex T1. In other words, an axis normal to a plane containing the opening 208b may be oriented away from the apex T1 of the tail cone T.

Alternatively, the louvers 208 may be defined by apertures extending through the wall T2 of the tail cone T of the aircraft A. The louvers 208 may be scoops configured for "scooping" a flow of air proximate the wall T2 of the tail cone T. The louvers 208 may be any suitable inlet features having any suitable shape allowing air to flow from the environment E toward the air inlet conduit 202.

In the embodiment shown, the disclosed power plant 200 takes advantage of a favorable static pressure distribution on the tail cone wall T1 in flight that might create a positive pressure differential between the louvers 208 and discharge locations. This favorable pressure differential might help the cooling fan (e.g., blower 214) performance by creating a "natural flow direction" into the engine compartment C.

In the embodiment shown, the air is drawn at the back of the aircraft A through inlet panels incorporating the forward facing louvers 208. Alternatively, the louvers may be defined as forward facing scoop inlets arranged circumferentially around the rear tail cone T external surface. A cooling flow F is directed to the engine compartment C by flowing into the annulus 206 located between the shroud conduit 202 and the engine exhaust duct 204.

In a particular embodiment, the disclosed cooling system allows the entrainment of large amount of cooling air, required for cooling the liquid cooled internal combustion engine, into the engine compartment. In a particular embodiment, the disclosed aircraft power plant offers several advantages: it might allow the entrainment of large quantity of cooling air; it might minimize aircraft drag in flight due to the proximity of both the inlet and exhaust outlet; it might offer support to a core exhaust duct that may or may not require acoustic treatment by introducing a collector duct which might function as a conduit to route the cooling fan outlet flow to the environment; it might offer enhanced shielding of the cooling fan to minimize its noise signature outside of the tail cone T; and it might allow filtration of the cooling air to prevent contamination of the large fouling sensitive heat exchangers.

For operating the cooling system 201, the rotatable load 115 is driven with the liquid cooled internal combustion aircraft power plant 200; a flow of cooling air is driven from the environment E outside the aircraft A via an the inlet 208 defined through the wall of the tail cone; and the flow of cooling air is heated by cooling a liquid coolant of the liquid cooled internal combustion aircraft power plant and expelling the heated flow of cooling air back to the environment at a location upstream of the air inlet relative to a direction of an airflow along the aircraft.

In the embodiment shown, the exhaust gases generated by the liquid cooled internal combustion aircraft power plant are expelled via the exhaust pipe 204 and driving the flow of the cooling air includes directing the flow of the cooling air via the 206 annulus defined between the air inlet pipe 202 and the exhaust pipe 204. In the depicted embodiment, driving the flow of cooling air from the environment E via the air inlet 208 includes driving the flow of cooling air from the environment E through louvers defined by the wall of the tail section of the aircraft proximate the apex of the tail section. Herein, driving the flow of cooling air includes scooping air from the environment with the louvers.

Embodiments disclosed herein include:

A. A cooling system for a liquid cooled internal combustion aircraft power plant for an aircraft having a tail cone, the cooling system comprising: an air inlet defined through a wall of the tail cone and fluidly connected to an environment outside the aircraft; a heat exchanger having at least one first conduit fluidly connected to the environment via the air inlet and at least one second conduit in heat exchange relationship with the at least one first conduit and fluidly connectable to a coolant circuitry of the liquid cooled internal combustion aircraft power plant; a blower fluidly connected to the environment via the air inlet; and an air outlet fluidly connected to the blower and defined through a wall of the aircraft upstream of the air inlet relative to a direction of an airflow along the aircraft.

B. An aircraft power plant configured to be located within a tail cone of an aircraft, comprising: an intermittent internal combustion engine having a coolant circuitry for circulating a liquid coolant; an air inlet defined through a wall of the tail cone and fluidly connected to an environment outside the aircraft; a heat exchanger having at least one first conduit fluidly connected to the environment via the air inlet and at least one second conduit in heat exchange relationship with the at least one first conduit and fluidly connected to the coolant circuitry; a blower fluidly connected to the environment via the air inlet; and an air outlet fluidly connected to the blower, the air outlet defined through a wall of the aircraft upstream of the air inlet relative to a direction of an airflow along the aircraft.

Embodiments A and B may include any of the following elements in any combinations:

Element 1: an exhaust of the liquid cooled internal combustion aircraft power plant is fluidly connected to the environment via an exhaust pipe and wherein the blower is fluidly connected to the air inlet via an annulus defined between the exhaust pipe and an air inlet pipe. Element 2: the air inlet pipe and the exhaust pipe are concentric. Element 3: the blower is located within a blower conduit having a conduit inlet fluidly connected to the environment via the air inlet and a conduit outlet fluidly connected to the environment via the air outlet, the heat exchanger disposed upstream of the conduit inlet, the at least one first conduit of the heat exchanger fluidly connected to the conduit inlet. Element 4: the blower conduit divides in two sub-conduits downstream of the blower, an exhaust pipe extending between the two sub-conduits, the exhaust pipe fluidly connecting an exhaust of the liquid cooled internal combustion aircraft power plant to the environment. Element 5: the liquid cooled internal combustion aircraft power plant includes an engine block defining at least one combustion chamber of varying volume, the engine block made of aluminum. Element 6: at least one thermal blanket disposed on and around the exhaust pipe. Element 7: the blower is in driving engagement with a shaft of the liquid cooled internal combustion aircraft power plant. Element 8: an annular wall extending at least radially from the exhaust pipe to the wall of the tail cone, the annular wall in a sealing engagement with the exhaust pipe and with the wall of the tail cone. Element 9: the air inlet is defined by louvers defined by the wall of the tail cone. Element 10: each of the louvers extends along a width taken in a circumferential direction relative to an axis of the aircraft and along a length taken in an axial direction relative to the axis, the width greater than the length. Element 11: each of the louvers defines an opening oriented away from an apex of the tail cone. Element 12: each of the louvers includes a slat extending at an angle from the wall to an edge of the slat, the opening defined between the wall and the edge of the slat. Element 13: the liquid cooled internal combustion aircraft power plant includes a rotary internal combustion engine.

C. A method of operating a cooling system for a liquid cooled internal combustion aircraft power plant for an aircraft having a tail cone, the method comprising: driving a rotatable load with the liquid cooled internal combustion aircraft power plant; driving a flow of cooling air from an environment outside the aircraft via an air inlet defined through a wall of the tail cone; and heating the flow of cooling air by cooling a liquid coolant of the liquid cooled internal combustion aircraft power plant and expelling the heated flow of cooling air back to the environment at a location upstream of the air inlet relative to a direction of an airflow along the aircraft.

Embodiment C may include any of the following elements in any combinations:

Element 20: expelling exhaust gases generated by the liquid cooled internal combustion aircraft power plant via an exhaust pipe and wherein driving the flow of the cooling air includes directing the flow of the cooling air via an annulus defined between an air inlet pipe and the exhaust pipe. Element 21: driving the flow of cooling air from the environment via the air inlet includes driving the flow of cooling air from the environment through louvers defined by the wall of the tail section of the aircraft proximate an apex of the tail section. Element 22: driving the flow of cooling air includes scooping air from the environment with the louvers.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A cooling system for a liquid cooled internal combustion aircraft power plant for an aircraft having a tail cone, the cooling system comprising: an air inlet defined through a wall of the tail cone and fluidly connected to an environment outside the aircraft; a heat exchanger having at least one first conduit fluidly connected to the environment via the air inlet and at least one second conduit in heat exchange relationship with the at least one first conduit and fluidly connectable to a coolant circuitry of the liquid cooled internal combustion aircraft power plant; a blower fluidly connected to the environment via the air inlet; and an air outlet fluidly connected to the blower and defined through a wall of the aircraft upstream of the air inlet relative to a direction of an airflow along the aircraft, wherein the air inlet is defined by louvers defined by the wall of the tail cone.

2. The cooling system of claim 1, wherein an exhaust of the liquid cooled internal combustion aircraft power plant is fluidly connected to the environment via an exhaust pipe and wherein the blower is fluidly connected to the air inlet via an annulus defined between the exhaust pipe and an air inlet pipe.

3. The cooling system of claim 2, wherein the air inlet pipe and the exhaust pipe are concentric.

4. The cooling system of claim 2, further comprising at least one thermal blanket disposed on and around the exhaust pipe.

5. The cooling system of claim 2, further comprising an annular wall extending at least radially from the exhaust pipe to the wall of the tail cone, the annular wall in a sealing engagement with the exhaust pipe and with the wall of the tail cone.

6. The cooling system of claim 1, wherein the blower is located within a blower conduit having a conduit inlet fluidly connected to the environment via the air inlet and a conduit outlet fluidly connected to the environment via the air outlet, the heat exchanger disposed upstream of the conduit inlet, the at least one first conduit of the heat exchanger fluidly connected to the conduit inlet.

7. The cooling system of claim 6, wherein the blower conduit divides in two sub-conduits downstream of the blower, an exhaust pipe extending between the two sub-conduits, the exhaust pipe fluidly connecting an exhaust of the liquid cooled internal combustion aircraft power plant to the environment.

8. The cooling system of claim 1, wherein the liquid cooled internal combustion aircraft power plant includes an engine block defining at least one combustion chamber of varying volume, the engine block made of aluminum.

9. The cooling system of claim 1, wherein the blower is in driving engagement with a shaft of the liquid cooled internal combustion aircraft power plant.

10. The cooling system of claim 1, wherein the liquid cooled internal combustion aircraft power plant includes a rotary internal combustion engine.

11. The cooling system of claim 1, wherein each of the louvers extends along a width taken in a circumferential direction relative to an axis of the aircraft and along a length taken in an axial direction relative to the axis, the width greater than the length.

12. The cooling system of claim 1, wherein each of the louvers defines an opening oriented away from an apex of the tail cone.

13. The cooling system of claim 1, wherein each of the louvers includes a slat extending at an angle from the wall to an edge of the slat, the opening defined between the wall and the edge of the slat.

14. A method of operating a cooling system for a liquid cooled internal combustion aircraft power plant for an aircraft having a tail cone, the method comprising:

driving a rotatable load with the liquid cooled internal combustion aircraft power plant;

driving a flow of cooling air from an environment outside the aircraft via an air inlet defined through a wall of the tail cone; and heating the flow of cooling air by cooling a liquid coolant of the liquid cooled internal combustion aircraft power plant and expelling the heated flow of cooling air back to the environment at a location upstream of the air inlet relative to a direction of an airflow along the aircraft, wherein driving the flow of cooling air from the environment via the air inlet includes driving the flow of cooling air from the environment through louvers defined by the wall of the tail section of the aircraft proximate an apex of the tail section.

15. The method of claim 14, further comprising expelling exhaust gases generated by the liquid cooled internal combustion aircraft power plant via an exhaust pipe and wherein driving the flow of the cooling air includes directing the flow of the cooling air via an annulus defined between an air inlet pipe and the exhaust pipe.

16. The method of claim 14, wherein driving the flow of cooling air includes scooping air from the environment with the louvers.

17. An aircraft power plant configured to be located within a tail cone of an aircraft, comprising: an intermittent internal combustion engine having a coolant circuitry for circulating a liquid coolant; an air inlet defined through a wall of the tail cone and fluidly connected to an environment outside the aircraft; a heat exchanger having at least one first conduit fluidly connected to the environment via the air inlet and at least one second conduit in heat exchange relationship with the at least one first conduit and fluidly connected to the coolant circuitry; a blower fluidly connected to the environment via the air inlet; and an air outlet fluidly connected to the blower, the air outlet defined through a wall of the aircraft upstream of the air inlet relative to a direction of an airflow along the aircraft, wherein an exhaust of the aircraft power plant is fluidly connected to the environment via an exhaust pipe, the blower fluidly connected to the air inlet via an annulus defined between the exhaust pipe and an air inlet pipe, and wherein at least one thermal blanket is disposed around the exhaust pipe.

* * * * *